US006308168B1

(12) United States Patent
Dovich et al.

(10) Patent No.: US 6,308,168 B1
(45) Date of Patent: Oct. 23, 2001

(54) METADATA-DRIVEN DATA PRESENTATION MODULE FOR DATABASE SYSTEM

(75) Inventors: Ronald J. Dovich, Austin, TX (US); Peter J. Eppele, Cincinnati, OH (US)

(73) Assignee: Knowledge Discovery One, Inc., Austin, TX (US)

( * ) Notice: Subject to any disclaimer, the term of this patent is extended or adjusted under 35 U.S.C. 154(b) by 0 days.

(21) Appl. No.: 09/246,475

(22) Filed: Feb. 9, 1999

(51) Int. Cl.$^7$ .................................................. G06F 17/30
(52) U.S. Cl. ........................ 707/1; 707/2; 707/3; 707/4; 345/326; 345/340; 345/352
(58) Field of Search ................... 707/1, 2, 3, 4, 707/5; 345/352, 340, 326

(56) References Cited

U.S. PATENT DOCUMENTS

| | | | |
|---|---|---|---|
| 5,432,925 | 7/1995 | Abraham et al. | 395/500 |
| 5,437,025 | 7/1995 | Bale et al. | 707/103 |
| 5,497,491 | 3/1996 | Mitchell et al. | 709/315 |
| 5,550,965 | 8/1996 | Gabbe et al. | 707/512 |
| 5,594,899 | 1/1997 | Knudsen et al. | 707/2 |
| 5,692,174 | 11/1997 | Bireley et al. | 707/3 |
| 5,692,175 | 11/1997 | Davies et al. | 707/3 |
| 5,692,181 | 11/1997 | Anand et al. | 707/102 |
| 5,710,900 | * 1/1998 | Anand et al. | 395/339 |
| 5,721,903 | * 2/1998 | Anand et al. | 707/5 |
| 5,721,911 | 2/1998 | Ha et al. | 707/100 |
| 5,787,412 | 7/1998 | Bosch et al. | 707/2 |

OTHER PUBLICATIONS

Alex Berson and Stephen J. Smith; "*Data Warehousing, Data Mining, & OLAP*",Jan. 1997; pp. 118–120, 132, 145, 192–220, 517–532.

Michael J.A. Berry and Gordon Linoff; "*Data Mining Techniques: For Marketing, Sales, and Customer Support*",Jan. 1997; pp. 429–431.

* cited by examiner

Primary Examiner—Jack Choules
Assistant Examiner—Cheryl Lewis
(74) Attorney, Agent, or Firm—Skjerven Morrill MacPherson LLP; David G. Dolezal; D'Ann Naylor Rifai

(57) ABSTRACT

A data presentation module presenting panels that are driven by metadata to allow a user to configure the presentation of information from a computer database system. The data presentation module is customized for the user's environment by configuring the metadata tables upon initial installation of the data presentation module software. Changes to the panels presented by the data presentation module can be performed by changing the metadata tables and without modifying the data presentation module software. The data presentation module initiates access of metadata files to obtain panel presentation parameters. Examples of panel presentation parameters include intra-panel presentation parameters and inter-panel presentation parameters. Intra-panel presentation parameters include the selection items to be displayed on the panel, the label by which a selection item will be identified on the panel, and the order in which each selection item is to be displayed on the panel. Intra-panel presentation parameters may also define a structure in which the selection items are to be displayed on the panel. Inter-panel presentation parameters include the types of panels and the order that the panels are to be displayed during the report configuration session. Panel presentation parameters may be configured according to configuration parameters such as individual users or projects. The invention displays panels to a user via a user interface according to the panel presentation parameters. The panels allow the user to configure the presentation of information from the database system.

70 Claims, 15 Drawing Sheets

| | 303 | 305 | 307 | 309 | 311 | 313 | 315 | 317 |
|---|---|---|---|---|---|---|---|---|
| | PARENT_REPORT_TYPE | REPORT_TYPE_ID | DISPLAY_ORDER | GUI_NAME | DESCRIPTION | LEAF_FLAG | PROJECT | OWNER |
| 1 | -1 | 1 | 1 | Standard Pack | Market Basket Analysis for All Merchandise | 0 | KD1DEMO | |
| 2 | -1 | 2 | 2 | Ad Pack | Market Basket Analysis for Ad Merchandise | 0 | KD1DEMO | |
| 3 | -1 | 3 | 3 | Customer Pack | Customer Analysis | 0 | KD1DEMO | |
| 4 | 1 | 11 | 1 | Performance Tracking | | 0 | KD1DEMO | |
| 5 | 1 | 12 | 2 | Market Basket Profiles | | 0 | KD1DEMO | |
| 6 | 1 | 13 | 3 | Product Affinity Analysis | | 0 | KD1DEMO | |
| 7 | 1 | 14 | 4 | Market Basket Totals | | 0 | KD1DEMO | |
| 8 | 11 | 111 | 1 | By Store | | 1 | KD1DEMO | |
| 9 | 11 | 112 | 2 | By Product | | 0 | KD1DEMO | |
| 10 | 112 | 1121 | 1 | By Division | | 1 | KD1DEMO | |
| 11 | 112 | 1122 | 2 | By Department | | 1 | KD1DEMO | |
| 12 | 112 | 1123 | 3 | By Category | | 1 | KD1DEMO | |
| 13 | 112 | 1124 | 4 | By Brand | | 1 | KD1DEMO | |
| 14 | 112 | 1125 | 5 | By UPC | | 1 | KD1DEMO | |
| 15 | 112 | 1126 | 6 | By Other Product Attribute | | 1 | KD1DEMO | |
| 16 | 12 | 121 | 1 | By Store | | 1 | KD1DEMO | |
| 17 | 12 | 122 | 2 | By Product | | 0 | KD1DEMO | |
| | 122 | 1221 | 1 | By Division | | 1 | KD1DEMO | |
| | 122 | 1222 | 2 | By Department | | 1 | KD1DEMO | |
| | 122 | 1223 | 3 | By Category | | 1 | KD1DEMO | |
| | 122 | 1224 | 4 | By Brand | | 1 | KD1DEMO | |
| | 122 | 1225 | 5 | By UPC | | 1 | KD1DEMO | |
| | 122 | 1226 | 6 | By Other Product Attribute | | 1 | KD1DEMO | |
| | 13 | 131 | 1 | Directed Affinity | | 0 | KD1DEMO | |
| | 13 | 132 | 2 | Frequent Item Sets | | 0 | KD1DEMO | |
| | 13 | 133 | 3 | Business Rules | | 0 | KD1DEMO | |
| | 131 | 1311 | 1 | By Division | | 1 | KD1DEMO | |
| | 131 | 1312 | 2 | By Department | | 1 | KD1DEMO | |
| | 131 | 1313 | 3 | By Category | | 1 | KD1DEMO | |
| | 131 | 1314 | 4 | By Brand | | 1 | KD1DEMO | |
| | 131 | 1315 | 5 | By UPC | | 1 | KD1DEMO | |
| | 131 | 1316 | 6 | By Other Product Attribute | | 1 | KD1DEMO | |
| | 132 | 1321 | 1 | By Category, Quarter | | 1 | KD1DEMO | |
| | 132 | 1322 | 2 | By Brand, Region, Week | | 1 | KD1DEMO | |
| | 132 | 1323 | 3 | By Brand, Store, Week | | 1 | KD1DEMO | |
| | 132 | 1324 | 4 | By UPC, Store, Week | | 1 | KD1DEMO | |
| | 133 | 1331 | 1 | By Category, Quarter | | 1 | KD1DEMO | |
| | 133 | 1332 | 2 | By Brand, Region, Week | | 1 | KD1DEMO | |
| | 133 | 1333 | 3 | By Brand, Store, Week | | 1 | KD1DEMO | |
| | 133 | 1334 | 4 | By UPC, Store, Week | | 1 | KD1DEMO | |
| | 14 | 141 | 1 | By Store | | 1 | KD1DEMO | |
| | 14 | 142 | 2 | By Product | | 0 | KD1DEMO | |

Figure 3A

| | PARENT_REPORT_TYPE | REPORT_TYPE_ID | DISPLAY_ORDER | GUI_NAME | DESCRIPTION | LEAF_FLAG | PROJECT | OWNER |
|---|---|---|---|---|---|---|---|---|
| 1 | -1 | 1 | 1 | Standard Pack | Market Basket Analysis for All Merchandise | 0 | KD1DEMO | USER1 |
| 2 | -1 | 2 | 2 | Ad Pack | Market Basket Analysis for Ad Merchandise | 0 | KD1DEMO | USER1 |
| 3 | -1 | 3 | 3 | Customer Pack | Customer Analysis | 0 | KD1DEMO | USER1 |
| | ... | ... | ... | ... | ... | ... | ... | ... |
| 7 | -1 | 1 | 1 | Standard Pack | Market Basket Analysis for All Merchandise | 0 | KD1DEMO | USER2 |
| 8 | -1 | 2 | 2 | Ad Pack | Market Basket Analysis for Ad Merchandise | 0 | KD1DEMO | USER2 |

*Figure 3B*

|   | 403 | 405 | 407 | 409 | 411 | 415 |
|---|---|---|---|---|---|---|
|   | REPORT_TYPE_ID | PANEL_NAME | DISPLAY_ ORDER | OWNER | PROJECT | DESCRIPTION |
| 1 | 111 (Performance Tracking by Store) | KD1 Display Panel | 1 |   | KD1DEMO | Display Panel |
| 2 | 111 (Performance Tracking by Store) | KD1 Constraint Panel | 2 |   | KD1DEMO | Constraint Panel |
| 3 | 111 (Performance Tracking by Store) | KD1 Summary Panel | 3 |   | KD1DEMO | Summary Panel |
| 4 | 1121 (Performance Tracking by Product by Division) | KD1 Display Panel | 1 |   | KD1DEMO | Display Panel |
| 5 | 1121 (Performance Tracking by Product by Division) | KD1 Summary Panel | 2 |   | KD1DEMO | Summary Panel |
| 6 | 141 (Market Basket Totals) | KD1 Constraint Panel | 1 |   | KD1DEMO | Constraint Panel |
| 7 | 141 (Market Basket Totals) | KD1 Summary Panel | 2 |   | KD1DEMO | Summary Panel |

*Figure 4*

Report: Standard Pack->Performance Tracking>By Store
By: Region, Year
Where: Region = 3 SOUTHEAST, 5 SOUTH

| Store | Region | Region Desc | Year | Tot Dist Items | Tot Units Sold | Dept Tot Sales Amt | Tot Margin Amt | Tot Dist Items | Tot Units Sold | Dept (Ad Only) Tot Sales Amt | Tot Margin Amt |
|---|---|---|---|---|---|---|---|---|---|---|---|
| 101 | 3 | SOUTHEAST | 1998 | 25 | 26 | $279.01 | ($12.69) | 0 | 0 | $0.00 | $0.00 |
| 102 | 3 | SOUTHEAST | 1998 | 49 | 49 | $794.88 | $338.27 | 4 | 4 | $44.01 | $27.27 |
| 105 | 3 | SOUTHEAST | 1998 | 124 | 143 | $994.70 | $159.54 | 15 | 18 | $93.64 | $15.83 |
| 101 | 5 | SOUTH | 1998 | 72 | 78 | $620.17 | $299.30 | 22 | 22 | $191.68 | $102.81 |
| 102 | 5 | SOUTH | 1998 | 41 | 41 | $694.59 | $401.89 | 3 | 3 | $44.97 | $32.94 |
| 105 | 5 | SOUTH | 1998 | 95 | 105 | $594.50 | $203.91 | 0 | 0 | $0.00 | $0.00 |

*Figure 14*

METADATA-DRIVEN DATA PRESENTATION MODULE FOR DATABASE SYSTEM

BACKGROUND OF THE INVENTION

1. Field of the Invention

The present invention relates in general to computer database systems, and in particular to presentation of information stored in the computer database system.

2. Description of the Related Art

Operational computer database systems have typically been designed to meet mission-critical requirements for supporting the day-to-day operations of a business, including on-line and batch processing of transactional data. An example of transactional data stored in computer database systems is point of sale (POS) data provided by electronic cash registers from the reading of bar codes on items being purchased. The millions of records generated by recording the day-to-day operations of a business, such as point-of-sale data, are often too detailed to be useful to strategic decision makers.

The analysis of transactional data to obtain useful knowledge is financially beneficial to businesses in the retail industry such as suppliers, retailers, large chains, local stores, and advertisers. For example, by analyzing transactional data, a retailer can determine the percentage of purchasers who buy milk during a transaction and also buy cookies. Accordingly, the retailer can estimate the effect of changing the price of milk on the number of cookie products purchased.

Data warehouses were developed to improve the productivity of decision makers by consolidating, converting, transforming, and integrating transactional data into useful knowledge. Data warehouses are therefore another form of computer database system that contain both detailed transaction-level data and summary information.

To facilitate the use of information in a computer database system, many computer database systems include metadata, or "data about data." Metadata includes technical information about operational databases, the transformations of operational data to produce the data stored in the data warehouse, and data warehouse management information. Metadata also includes business information to help users understand the data stored in the data warehouse. Typically, metadata is organized as a set of database tables, separate from the operational databases. However, metadata may be stored as any type of file. The user can view metadata to determine the types of information available in the computer database system.

A particular end user such as a product manager of a retail chain may be concerned only about a specific area of the useful knowledge, such as summary information for a single product or group of products. Another end user in the same company, such as a store manager, may instead wish to examine information for each store. Because some end users may not possess sufficient computer skills or knowledge of the technical information necessary to access information in the different parts of the warehouse, computer database systems often have a set of pre-programmed report types from which the user may select. Reports may present information to the user in statistical, textual and/or graphical form.

To enable a user to easily select from these pre-programmed report types, computer database systems often include data presentation modules. Data presentation modules enable a user to customize reports by specifying "report criteria." An example of a report criterion is a specified date range to which the data displayed in the report will be limited. Data presentation modules may also allow the user to specify report criteria such as the data fields to appear as columns on the report. The user will use the data presentation module in a "report configuration session," in which the user specifies the report criteria desired for the report of interest. Because different users will have different requirements of a report, the data presentation module should provide the user with as much flexibility as possible in specifying report criteria to customize the information to be displayed.

In a typical data presentation module of a computer database system, adding new report types or changing the report criteria available to customize a report type typically involves modifying the data presentation module software. Because the list of available report types and/or the report criteria available for each report type may change rapidly, a data presentation module that can be easily modified to meet organizational and even individual user needs is desirable.

SUMMARY OF THE INVENTION

It has been discovered that a data presentation module presenting panels that are driven by metadata provides many advantages such as ease of maintenance, support, and customization for individual users. The data presentation module is customized for the user's environment by configuring the metadata tables upon initial installation of the data presentation module software. Changes to the panels presented by the data presentation module can be performed at any time by changing the metadata tables and without modifying the software for the data presentation module. Placing the data that controls the display of the panels into metadata, rather than in a separate database, allows all "data about data" to be consolidated. Maintenance, support, and customization of the data presentation module is centralized and greatly simplified.

In one aspect of the invention, a method for configuring presentation of information from a database system includes initiating access of at least one metadata file to obtain at least one panel presentation parameter from the at least one metadata file. The method also includes displaying at least one panel via a user interface according to the at least one panel presentation parameter obtained from the metadata file. The at least one panel allows a user to configure the presentation of information from a database system.

In another aspect of the invention, an article of manufacture includes a computer-readable medium. The article of manufacture also includes means for initiating access of at least one metadata file to obtain at least one panel presentation parameter from the at least one metadata file. The means for initiating access is stored in the computer-readable medium. The article of manufacture also includes means for displaying at least one panel via a user interface according to the at least one panel presentation parameter obtained from the metadata file. The means for displaying is stored in the computer-readable medium. The at least one panel allows a user to configure the presentation of information from a database system.

BRIEF DESCRIPTION OF THE DRAWINGS

The present invention may be better understood, and its numerous objects, features, and advantages made apparent to those skilled in the art by referencing the accompanying drawings.

FIG. 3A shows a metadata table containing panel presentation parameters used to display the report type panel for presentation to a user during a report configuration session according to the present invention.

FIG. 3B shows an alternative metadata table containing panel presentation parameters used to display the report type panel for presentation to a user during a report configuration session according to the present invention.

FIG. 4 shows a metadata table containing panel presentation parameters used to display subsequent panels to be presented during a report configuration session for the selected report type according to the present invention.

FIG. 14 shows the display of a completed report during a report configuration session according to the present invention.

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1:
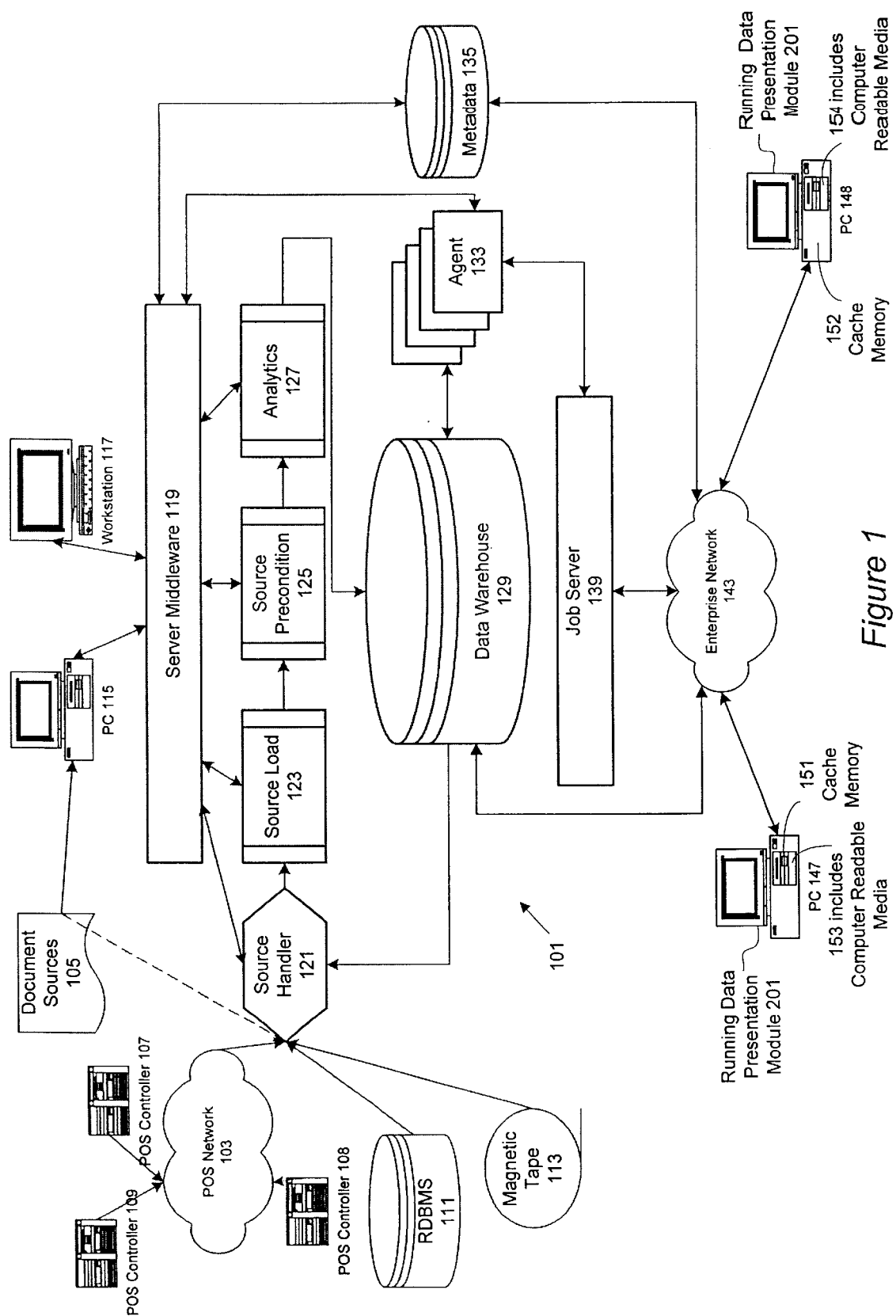
FIG. 1 is a block diagram showing a system for receiving large volumes of transactional data and for generating useful knowledge from that transactional data.

FIG. 1 shows a system 101 for receiving large volumes of transactional data and for generating useful knowledge from that transactional data. Transactional data includes information about the purchase of items and/or services such as groceries, clothing, hardware, household goods, computer equipment, entertainment equipment, prepared food, etc. Types of transactional data include, e.g., the number of items purchased, the different types of items purchased, the time that the purchase was made, the sales price of each item, the register and cashier of the transaction, the advertising or promotional program being run by the retailer or brand provider during the purchase, the profit margin of the item purchased, the sales tax generated by the item, the type of payment made with the purchase, weather conditions during the purchase, etc. Examples of "useful knowledge" that system 101 generates from its analysis of the transactional data include prediction models, estimation models, and association rules regarding the transactional activity of the items. An example of system 101 includes the RETAIL DISCOVERY SUITE as provided by KNOWLEDGE DISCOVERY ONE, INC. of Austin, Tex.

System 101 is configured as a client/server database system, although the present invention may be used in other types of database systems. The client/server computing model implies a cooperative processing of requests submitted by a client, or requester, to a server which processes the requests and returns the results to the client. Specialized software typically is used by both clients and servers of the client/server system to facilitate the processing of these requests. Client software is executed by the user to request information from the database system. Server software interacts directly with the computer databases to obtain the information to fulfill the client's request. System 101 includes three types of computer databases: operational databases 111, data warehouse 129, and metadata 135.

A source handler 121 collects and loads transactional data from data sources and assembles the data into parallel input streams. Source handler 121 receives live, stream-oriented feeds from point of sale (POS) store controllers (107–109) which receive data from point of sale devices (not shown). Source handler 121 may also receive post-processed data from network and relational database (e.g. RDBMS 111) sources. Data may also be loaded from magnetic tapes 113 and paper-based sources 105 (via OCR/scanning and manually assisted input). Data may also be entered into system 101 via a computer system 115 or workstation 117.

A source load component 123 is used to build dimension and look-up tables, build concrete schemas for upload to the metadata 135 of system 101, and build parallel data sets for upstream processing. The targets of source loader 123 are used in the next stage of input processing by the source preconditioner component 125.

Source preconditioner component 125 performs processing similar to common data warehouse cleansing and load functions. The source preconditioner 125 may also perform statistical characterization, information-theoretic measurements, and distribution measurements of the input data. Source preconditioner 125 may also aggregate, summarize, and format transactional data. Source preconditioner 125 may also perform statistical transformation and distribution transformation on the input data, synthesize new variables, and perform other pre-conditioning (e.g. data reduction, PCA, normalization etc.) required for the application of machine-learning and algorithmic analysis.

The analytic component 127 performs machine learning and other algorithmic processing on the pre-conditioned source transactional data to derive useful knowledge from the transactional data. This stage of the pipeline is responsible for generating predictive models, association rules, frequent sets, and model-free result sets from the transactional data.

Although FIG. 1 shows one example of a system for receiving transactional data and for generating useful knowledge from that transactional data, those of skill in the art will recognize that, based upon the teachings herein, other systems may be utilized for receiving transactional data and for generating useful knowledge from that transactional data.

Useful knowledge generated by system 101 is presented to the end user via a data presentation module 201 on personal computers 147 and 148. Although both user stations in FIG. 1 are illustrated as personal computers, the data presentation module 201 may also be presented on a workstation or other type of computer system running client software. The data presentation module 201 running on personal computers 147 and 148 is operably coupled to metadata 135 through the enterprise network 143 in the preferred embodiment of the invention. However, in other embodiments metadata may reside on personal computers 147 and 148. Tables in metadata 135 contain panel presentation parameters used by the data presentation module 201 in displaying panels to the user during a report configuration session.

The client software modules included in system 101 may be received by computer system 147 or 148, for example, from computer readable media 153 or 154. Computer readable media 153 or 154 may be permanently, removably, or remotely coupled to computer system 147 or 148, although it is shown in FIG. 1 as permanently coupled. Computer readable media 153 or 154 may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application-specific integrated circuits; volatile storage media including registers, buffers, caches, main memory, RAM, etc.; and data transmission media including computer network, point-to-point telecommunication, and carrier wave transmission media. In a UNIX-based embodiment, the client software modules may be embodied in a file which may be a device, a terminal, a local or remote file, a socket, a network connection, a signal, or other expedient of communication or state change. Other new and various types of computer-readable media may be used to store and/or transmit the client software modules discussed herein.

Figure 2:
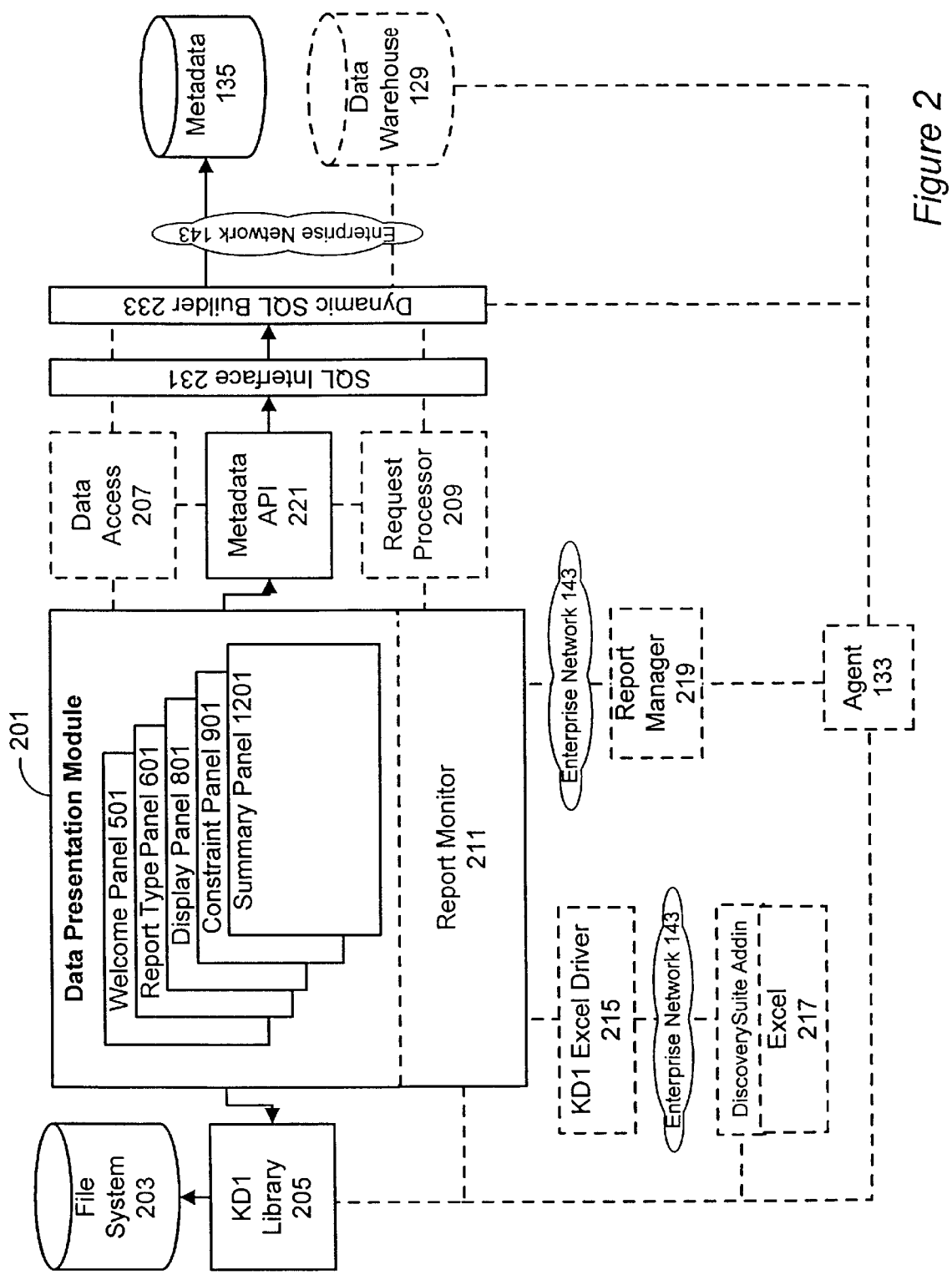
FIG. 2 is a component diagram showing components of a data presentation module of the system shown in FIG. 1 and the relationship of the data presentation module to other components of the system according to the present invention.

FIG. 2 shows a component diagram of the data presentation module 201 and the various components of system 101 with which the data presentation module 201 interacts. The data presentation module 201 enables a user to select the information desired from system 101, thus enabling a user to build a customized report to meet his or her specific needs. Depending upon the report type selected, a series of panels will be presented to the user to allow configuration of the report criteria for the selected report type. The panels are presented to the user by the data presentation module 201 according to panel presentation parameters contained in tables in metadata 135.

In one embodiment, the panels are presented to the user during the report configuration session following the "wizard" style of help facility used in MICROSOFT WORD. For example, in a wizard, selection items from which the user may select are presented in panels. Displayed with each panel presented to the user are buttons, such as buttons collectively labeled 509 in FIG. 5, that enable the user to initiate the display of previous or succeeding panels of the session.

Upon initiation of a report configuration session by the user on personal computer 147 or 148, the data presentation module 201 loads into cache 151 all tables in metadata 135 used to display panels to the user. However, in other embodiments, the data presentation module 201 may be configured to load only particular tables in metadata 135, or no tables in metadata 135, into cache initially. If a metadata table is not in cache when it is needed, the data presentation module 201 will request the necessary tables from metadata 135 during the report configuration session. Initially loading metadata into cache reduces the overhead of directly accessing metadata before displaying each panel during a report configuration session.

In FIG. 2, data presentation module 201 interacts with various components of system 101 to present a series of panels to the user during a report configuration session. To the right of the data presentation module 201 in FIG. 2 are shown three components: (1) data access 207, (2) metadata API 221 and (3) request processor 209. Each of these components resides on the user's personal computer 147 or 148. The metadata API 221 operably couples the data presentation module 201 to metadata 135. For example, the metadata API 221 enables the data presentation module 201 to retrieve the metadata that is used to display panels to the user during a report configuration session.

FIG. 2 shows five different types of panels that may be displayed by the data presentation module 201 during a report configuration session: welcome panel 501, report type panel 601, display panel 801, constraint panel 901, and summary panel 1201. Other types of panels, including graphical panels and further report criteria panels such as transaction profiling panels, may also be used in a data presentation module. Each panel may contain a window displaying the organization's logo, such as window 503 of FIG. 5, and a window displaying the status of reports the user requested in previous report configuration sessions, such as window 511 of FIG. 5. The status information displayed in window 511 is displayed by the report monitor 211 component of the data presentation module 201.

Each different type of panel may provide the user with additional report criteria for configuring the selected report type. Panels are displayed according to the panel presentation parameters obtained from metadata. The types of panel presentation parameters used by the data presentation module include the following: (1) intra-panel presentation parameters, which determine the placement of items on a panel, and (2) inter-panel presentation parameters, which control the type and order of panels that are displayed during a report configuration session.

Intra-panel presentation parameters used by the data presentation module may include the following: the selection items to be displayed on the panel, the label by which a selection item will be identified on the panel, and the order in which each selection item is to be displayed on the panel. Intra-panel presentation parameters may also define a structure in which the selection items are to be displayed on the panel. A structure organizes selection items into groupings so that a selection item on a panel may be a grouping of "children" selection items. Other examples of selection items are report types, display data fields, constraint data fields, and other criteria offered to the user for configuring a report. Selection items may be configured according to configuration parameters such as individual users and/or projects.

Inter-panel presentation parameters used by the data presentation module include the types of panels that are to be displayed during a report configuration session and the order that the panels are to be displayed during a report configuration session. The types of panels and the order in which they are displayed may be configured according to configuration parameters such as individual users and/or projects.

As noted earlier, the data presentation module 201 reads the panel presentation parameters from tables in metadata 135 from either cache memory 151 if metadata is pre-loaded into cache or by invoking the metadata API 221 to request information from metadata 135.

Referring again to FIG. 2, the data access component 207 is used whenever the data presentation module 201 requests information from the data warehouse 129 directly. For example, the data warehouse 129 may be accessed during a report configuration session to determine the validity of values entered by the user, such as values for a particular data field to be used as a constraint.

The request processor 209 processes the report criteria selected by the user during the report configuration session, which are communicated by the data presentation module 201 to the request processor 209 when the user has requested to run a report. The request processor 209 converts the report criteria selected to a form needed to retrieve the requested information from the data warehouse 129.

In FIG. 2, metadata API 221 is operably coupled to metadata 135 and data warehouse 129 through a Dynamic SQL Builder 233 and an SQL Interface 231. In one embodiment, the Dynamic SQL Builder 233 is a commercially available software program DSS OBJECTS sold by MICROSTRATEGY as part of its DSS SUITE product. The Dynamic SQL Builder 233 uses information from metadata 135 to dynamically build the Structured Query Language (SQL) code to retrieve information from the data warehouse 129. The SQL Interface 231 is a custom-developed interface between the data presentation module 201 and the Dynamic SQL Builder 233. The SQL Interface 231 receives information about the user's request through data access component 207, metadata API 221, and request processor 209. SQL Interface 231 then transforms and communicates information to Dynamic SQL Builder 233, which invokes agents 133 to retrieve the necessary information from the data warehouse 129. Agents 133 then communicate information for the report back to the user through the report manager 219 and the report monitor 211. With other embodiments, SQL Interface 231 and Dynamic SQL Builder 233 may be integrated into a single component that retrieves information from the data warehouse for a report for the user.

The metadata API 221, SQL Interface 231, and Dynamic SQL Builder 233 all reside on the user's personal computer 147 or 148.

Working files for the data presentation module 201 and user-created files are stored in file system 203. File system 203 may reside anywhere on system 101 but preferably resides on the user's personal computer 147 or 148. The KD1 library 205 resides on the user's personal computer 147 or 148 and enables the data presentation module 201 to communicate with other components of system 101, such as file system 203.

The report monitor component 211 of the data presentation module 201 obtains information about the status of requested reports from a report manager 219. The report manager 219 invokes software components called agents 133 to obtain useful knowledge from the data warehouse 129 and/or initiate routines in the analytic component 127 to generate desired useful knowledge. The report manager 219 may reside on either a enterprise network 143 file server or on the user's personal computer 147 or 148.

When all information has been retrieved for the requested report, the report monitor component 211 of the data presentation module 201 indicates that the report is completed and allows the user to initiate the display of the report. To display the report to the user, the report monitor 211 uses various software programs to display reports in graphical, tabular, or textual form. For instance, textual and/or tabular reports may be presented in a spreadsheet format where the MICROSOFT EXCEL software program 217 is used to display the report. Report drivers, such as the KD1 Excel Driver 215 shown in FIG. 2, are used to communicate with the software that will present the report and typically reside on the user's personal computer 147 or 148. The Excel software 217 may reside on an application server in the enterprise network 143 or on the user's personal computer 147 or 148.

FIGS. 3A, 3B and 4 show metadata tables used by the data presentation module 201 to control the display of panels presented to the user. FIGS. 5 through 14 show panels of a report configuration session conducted by a user using the data presentation module 201.

FIG. 3A shows a portion of a table in metadata used by the data presentation module during a report configuration session. Metadata table 301, referred to as the Report Type Table, is used by the data presentation module to display panels which allow the user to select a type of report to be run to retrieve data from the computer database system. For the data presentation module 201, the selection items to be presented on the report type panel include report types, report type groupings, and report type sub-groupings available to the user. (A report type sub-grouping may have further sub-sub-groupings, and so on, depending upon the number of levels in the report type selection tree.) Report Type Table 301 is used by the data presentation module to configure the report type display panel 601 of FIGS. 6 and 7 of the report configuration session.

Figure 6:
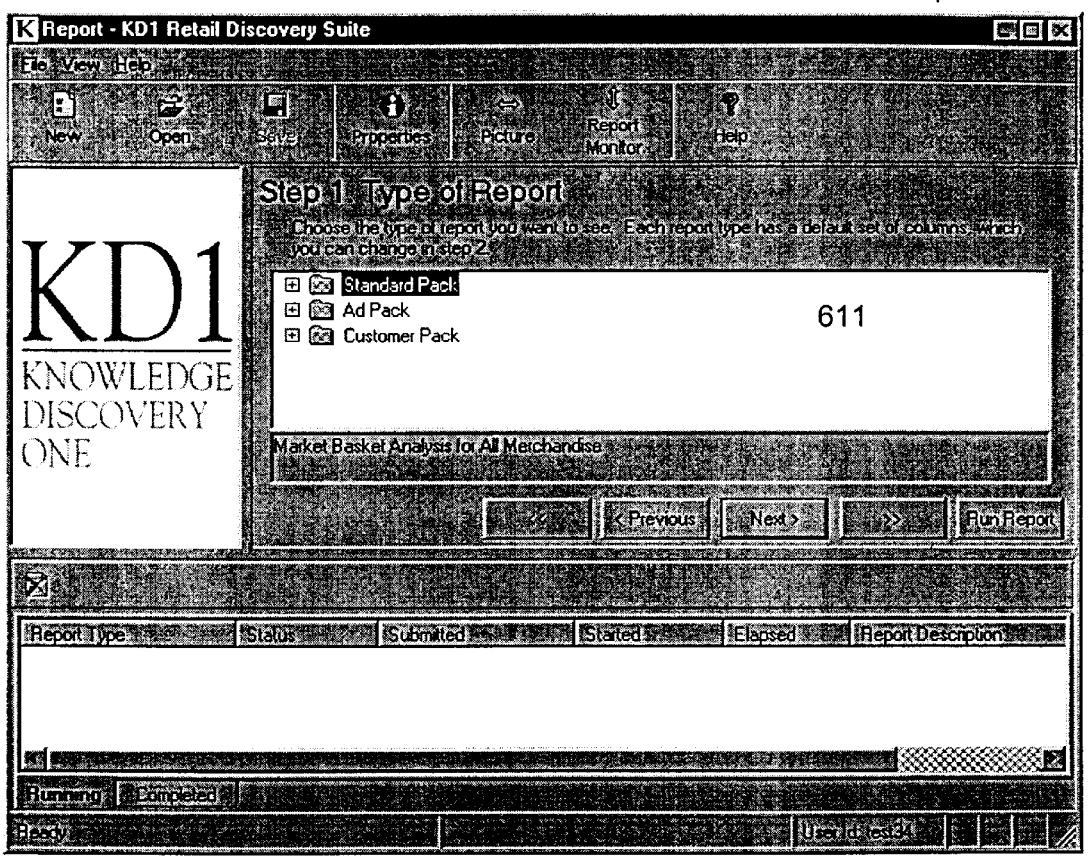
FIG. 6 shows a report type panel presented to the user for selecting a report type during a report configuration session according to the present invention.

Each column of Report Type Table 301 plays a role in configuring the report type panel 601 of FIG. 6. In FIG. 6, the report type selection items are presented to the user in Window 611 in a tree structure, similar to the directory tree presented in MICROSOFT's WINDOWS EXPLORER and FILE MANAGER products. A tree structure is often used to group selection items when there are too many selection items to conveniently fit as alternative selection items on a panel. The data presentation module 201 supports both report types and/or report type groupings as selection items at the highest, or "root", level of the tree structure.

In a tree structure, the root level of the tree contains the primary selection items from which the user may select. In FIG. 6, the root level of the tree contains report type groupings. Each lower level of the tree presents the selection items in that grouping; i.e., the lower level may contain further sub-groupings of selection items, or it may contain ungrouped selection items. If a selection item in the tree has "children" options (i.e., it is a grouping), it will be displayed with a "+" icon to its left. Clicking on the selection item grouping icon or the "+" icon will expand the tree to show lower-level choices for that selection item. If a selection item has no "children" options (in this case, it is a report type from which the user may select), it will not be displayed with a "+" icon to its left. Clicking on the selection item will highlight the selection item but not expand the tree any further.

In FIG. 3A, REPORT_TYPE_ID column 305 contains an identifier (referred to as REPORT_TYPE_ID) for each report type, report type grouping, or report type sub-grouping. In row 1, the "Standard Pack" report type grouping has been assigned a REPORT_TYPE ID of "1"; in row 2, "Ad Pack" has been assigned a REPORT_TYPE_ID of "2"; and in row 3, "Customer Pack" has been assigned a REPORT_TYPE_ID of "3".

The text appearing in GUI_NAME column 309 is the label that appears on the report type panel 601 for the REPORT_TYPE_ID contained in that row of the table. For instance, the three root options in the report type tree structure are labeled "Standard Pack", "Ad Pack", and "Customer Pack", as shown in window 611 of FIG. 6. To change the label for the "Standard Pack" report type grouping in window 611, the data presentation module administrator would change the value in row 1 of the GUI_NAME column 609 from "Standard Pack" to the new name.

The value of the PARENT_REPORT_TYPE column 303 is the REPORT_TYPE_ID of the "parent" of the report type in the report type tree. The value of the PARENT_REPORT_TYPE column 303 determines the report type grouping into which the given report type or report type sub-grouping is placed in the tree structure. The report type tree is presented in window 611 of the report type panel 601 of FIG. 6. Because a report type at the root of the tree will have no parent, a special value of "−1" is used to indicate report types that should appear at the root level of the report type tree. For instance, because rows 1, 2 and 3 of the Report Type Table column 303 have a "−1" value for PARENT_REPORT_TYPE, the user has three root report types from which to select, as shown in window 611 of FIG. 6.

For report types that are not at the root of the report type tree, the PARENT_REPORT_TYPE column 303 indicates which report type grouping or sub-grouping is its "parent" in the report type tree structure. The value in the PARENT_REPORT_TYPE column 303 indicates at which level of the report type tree structure the report type or report type sub-grouping should appear. For instance, the "Standard Pack" report type grouping, with a REPORT_TYPE_ID of "1", is the parent of four children, as shown in rows 4 through 7, each having a value of "1" in the PARENT_RECORD_TYPE column 303. These four children are, as labeled in the GUI_NAME column 309, "Performance Tracking", "Market Basket Profiles", "Product Affinity Analysis", and "Market Basket Totals". Accordingly, in window 611 of FIG. 7, the "Standard Pack" report type grouping has four sub-groupings at the next level in the report type tree: "Performance Tracking" (shown in FIG. 7 with further sub-sub-groupings, as will be discussed in the following paragraph), "Market Basket Profiles", "Product Affinity Analysis", and "Market Basket Totals".

Figure 7:
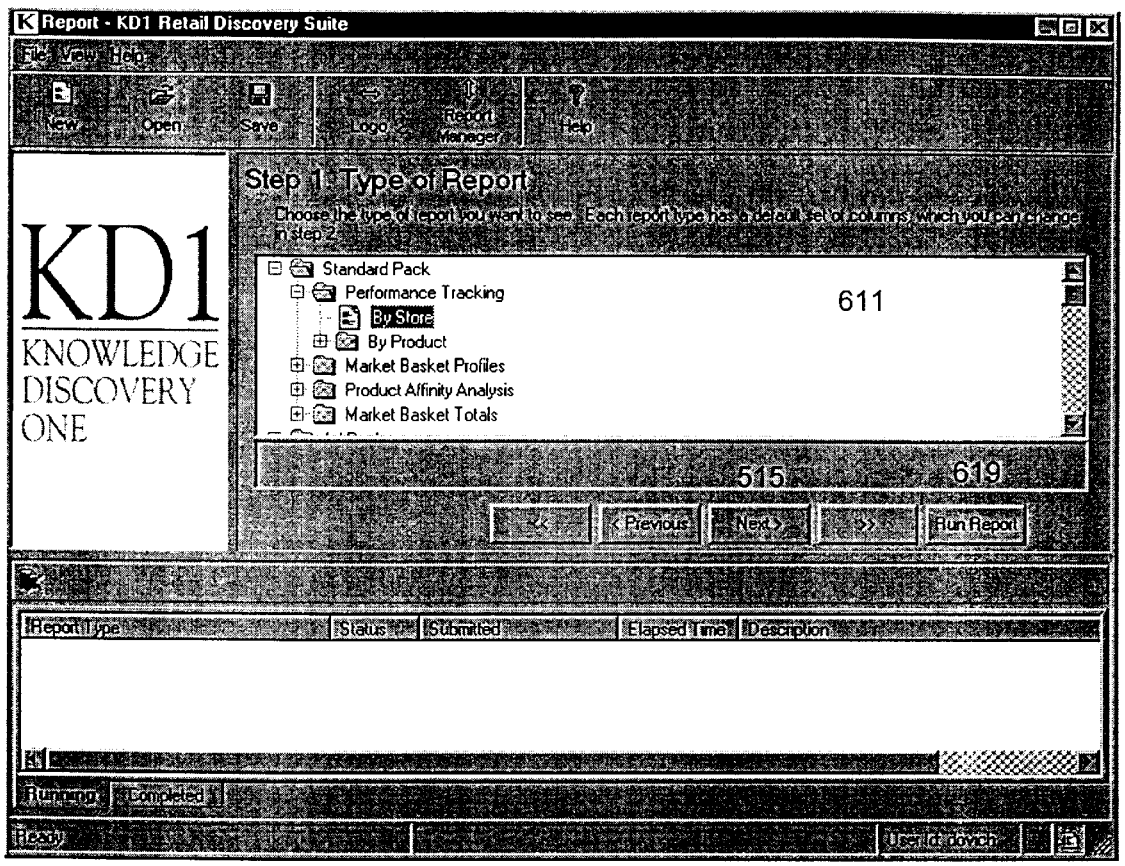
FIG. 7 shows the expansion of the report type tree in the report type panel after the selection of the "Standard Pack Performance Tracking" report type sub-grouping during a report configuration session according to the present invention.

In row 4 of FIG. 3A, the "Performance Tracking" report type sub-grouping of the "Standard Pack" report type grouping has been assigned a REPORT_TYPE_ID of "11" in column 305. REPORT_TYPE_ID "11" is used in the PARENT_REPORT_TYPE column 303 to indicate the children for the "Performance Tracking" report type sub-grouping of the "Standard Pack" report type grouping. Because rows 8 and 9 of the Report Type Table 301 have a value of "11" in the PARENT_REPORT_TYPE column 303, the "Performance Tracking" report type sub-grouping has two report type sub-sub-groupings: "By Store" and "By Product". Accordingly, window 611 of FIG. 7 shows the "Performance Tracking" report type sub-grouping with two options at the next level in the report type tree: "By Store" and "By Product".

The DISPLAY_ORDER column 307 of the Report Type Table 301 is used to indicate the order in which report type, report type grouping, or report type sub-grouping is displayed within a particular level of the report type tree. For instance, the three primary report type groupings are each assigned an order of display. "Standard Pack" has DISPLAY_ORDER of "1", indicating it will be first; "Ad Pack" has DISPLAY_ORDER OF "2" and is second; and "Customer Pack" has DISPLAY_ORDER of "3" and is third, as shown in window 611 of FIG. 6. To change the order of these report types as they appear in the report type tree of FIG. 6, the data presentation module administrator would revise the values in the DISPLAY_ORDER column, and the display order would be changed accordingly in all subsequent user report configuration sessions.

In FIG. 3A, the LEAF_FLAG column 313 of the Report Type Table 301 is used to indicate that the current report type option is a "leaf" in the report type tree. A leaf selection item has no further options; i.e., the selection item has no children. For instance, in row 8, the "By Store" report type has a value of "1" for LEAF_FLAG in column 313, indicating that it is a leaf item. Accordingly, in FIG. 7, the "Standard Pack Performance Tracking By Store" selection item does not appear with a "+" icon to its left, indicating that there are no further choices for the "Standard Pack Performance Tracking By Store" selection item. The "Standard Pack Performance Tracking By Store" is a report type. The selected report type determines the subsequent panels to be presented to the user during the report configuration session. The entries in the LEAF_FLAG column 313 are also used to indicate when to display a report type icon. They are also used to short circuit the recursive function call utilized in building a tree structure.

In contrast, in row 9 of FIG. 3A, the "Standard Pack Performance Tracking by Product" report type sub-sub-grouping, with REPORT_TYPE_ID of "112" in column 305, has a value of "0" in LEAF_FLAG column 313, indicating that it is not a leaf item. Accordingly, in FIG. 7, the "Standard Pack Performance Tracking by Product" selection item appears with a "+" icon to its left, indicating that this selection item has further choices. Value "112" appears in the PARENT_REPORT_TYPE column 303 six times in rows 10 through 15, indicating that the "Standard Pack Performance Tracking by Product" selection item has six additional options: "By Division", "By Department", "By Category", "By Brand", "By UPC", and "By Other Product Attribute". Each of these "children" report types for the "Performance Tracking by Product" report type has a LEAF_FLAG of "1", indicating that no further options are available for these selection items. These six report types are leaves in the report type tree. The user's selection of a report type determines the subsequent panels that are displayed to the user.

As indicated by the DESCRIPTION column 311, the Standard Pack provides market basket analysis for all merchandise, the Ad Pack provides market basket analysis for ad merchandise, and the Customer Pack provides customer analysis.

In FIG. 3A, the PROJECT column 315 allows for customization of the report type panel presented to the user during a report configuration session for a particular project or a particular user. While all rows in FIG. 3A show "KD1DEMO" as the PROJECT value, different values may be used to customize the report types, report type groupings, and report type sub-groupings available for different projects and/or users.

FIG. 3B shows a portion of an alternative Report Type Table with customized report type groupings for USER1 and USER2. Note that in rows 1 through 3, USER1 may access all three root report type groupings: "Standard Pack", "Ad Pack", and "Customer Pack". In contrast, in rows 7 and 8, USER2 may access only the "Standard Pack" and "Ad Pack" report type groupings.

In FIG. 4, a portion of the Panel Sequence Table 401 is displayed. The Panel Sequence Table 401 is used by the data presentation module 201 after the user has selected a report type. Metadata table 401 is used by the data presentation module to determine the types of panels that will be displayed for the selected report type and the order in which the panels are displayed.

The REPORT_TYPE_ID column 403 contains the same values for REPORT_TYPE_ID as the Report Type Table 301 column 305 of FIG. 3A. The common value in REPORT_TYPE_ID columns of the two tables indicates that the panels represented by each row of table 401 are to be displayed for the report type selected from Report Type Table 301 of FIG. 3A.

The PANEL_NAME column 405 contains the name of a panel to be displayed for that particular report type. The DISPLAY_ORDER column 407 contains a value indicating the order in which the panel indicated in column 405 is to be displayed for the selected report type as given in column 403 of the row.

The OWNER column 409 can be used to limit user access to the report types. The PROJECT column 411 allows the panels to be presented for each report type to be customized for a particular user and/or project. The DESCRIPTION column 415 provides a description for each panel to be displayed.

For example, the panels to be displayed for report type "111" ("Standard Pack Performance Tracking by Store") are shown in rows 1 through 3. As shown in PANEL_NAME column 405, the panels presented to the user are a display panel (row 1 of table 401), a constraint panel (row 2 of table 401) and a summary panel (row 3 of table 401), in that order (as determined by the order values in column 407). In contrast, for report type "1121" ("Standard Pack Performance Tracking by Product by Division"), rows 4 and 5 show the panels to displayed: a display panel (row 4 of table 401) and a summary panel (row 5 of table 401), in that order (as determined by the order values in column 407). Because table 401 does not contain a row with report type "1121" and a "Constraint Panel" in column 405, report type "1121" has no option to constrain the data. For report type "141" ("Standard Pack Market Basket Totals"), the panels presented to the user are shown in rows 6 and 7: a constraint panel (row 6 of table 401) and a summary panel (row 7 of table 401), in that order (as determined by the order values in column 407). Because table 401 does not contain a row with report type "141" and a "Display Panel" in column 405, report type '141' has no option for the user to configure the particular columns to be displayed on the report. As with the other metadata tables used by the data presentation module, the Panel Sequence Table 401 may be customized at the project or user level by entering appropriate values in the PROJECT column. Such a customization would provide some users with additional panels for a particular report type selection.

To add a report type to the data presentation module 201, the data presentation module administrator enters new row (s) into tables in metadata 135 such as the Report Type Table 301 of FIG. 3A and the Panel Sequence Table 401 of FIG. 4. To add a new panel to a report type, the data presentation module administrator adds a new row to the Panel Sequence Table 401 and adjusts the DISPLAY_ORDER values of the existing panels for that report type.

By appropriately configuring the data in the metadata tables, the data presentation module administrator can customize the panels to be presented to the user during a report configuration session to meet a particular organization's and/or individual user's needs. Adding a new report type or changing report criteria can be accomplished by making changes to metadata tables without the need to recompile and reinstall the data presentation module software.

FIGS. 5 through 14 show an exemplary report configuration session using the data presentation module. The panels presented to a user during a report configuration session are displayed by the data presentation module 201 according to the data in tables in metadata 135 such as the Report Type Table 301 of FIG. 3A and the Panel Sequence Table 401 of FIG. 4.

A report configuration session begins when a user clicks on a data presentation module icon (not shown) on the personal computer 147 or 148. In one embodiment, upon invocation of the data presentation module, the data presentation module software uses the metadata API 221 to load tables in metadata 135 into cache memory 151 of the user's personal computer 147 or 148. The tables in metadata 135 loaded into cache memory 151 may include tables similar to the Report Type Table of FIG. 3A and the Panel Sequence Table of FIG. 4.

Figure 5:
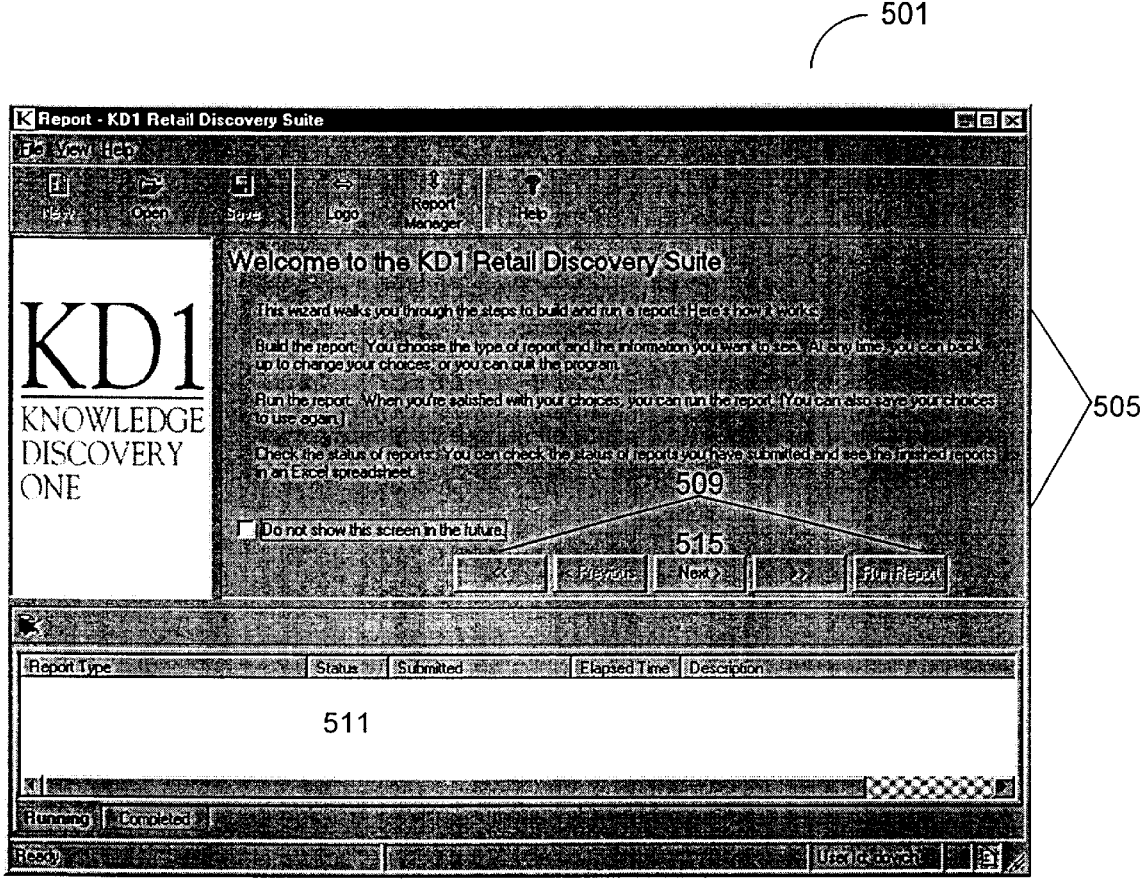
FIG. 5 shows a welcome panel presented to the user upon initiating a report configuration session according to the present invention.

Referring to FIG. 5, a welcome panel 501 appears when a user begins the report configuration session. The welcome panel 501 displays instructional text 505 to assist the user in configuring a report. Following the wizard style, a set of buttons 509, which are displayed with the welcome panel 501, enables the user to initiate the display of previous or succeeding panels of the session. By clicking on the "Next" button 515, the user will be presented with a report type panel displaying a set of report types from which to select. The data presentation module 201 will access metadata tables to display a report type panel 601, shown in FIG. 6.

In FIG. 6, report type panel 601 displays a tree of report types from which a user may select. The report types available to the user and the placement of the report type selection items in a tree structure are determined from tables in metadata 135 such as the Report Type Table 301 of FIG. 3A. In the report configuration session of FIG. 6, three root report types are available to the user: Standard Pack Reports, Ad Pack Reports, and Customer Reports. By highlighting one of these three choices and clicking on the icon next to it, the options for that particular report type are expanded as a report type tree, as shown in FIG. 7.

FIG. 7 shows a report type panel 601 displayed during the report configuration session as the user is selecting a report type grouping. As shown in FIG. 7, the user highlighted the report type grouping "Standard Pack", the report type subgrouping "Performance Tracking", and the report type sub-sub-grouping "By Store" in the report type tree. Because the "Standard Pack Performance Tracking By Store" report type has no lower level choices, the user may either specify report criteria for the "Standard Pack Performance Tracking By Store" report type by clicking on the "Next" button 515, or the user may run the report with its default report criteria by clicking on the "Run Report" button 619. If the user clicks on the "Next" button 515, the data presentation module software will read table 401 to determine the next panel to present to the user for the report type selected.

Figure 8:
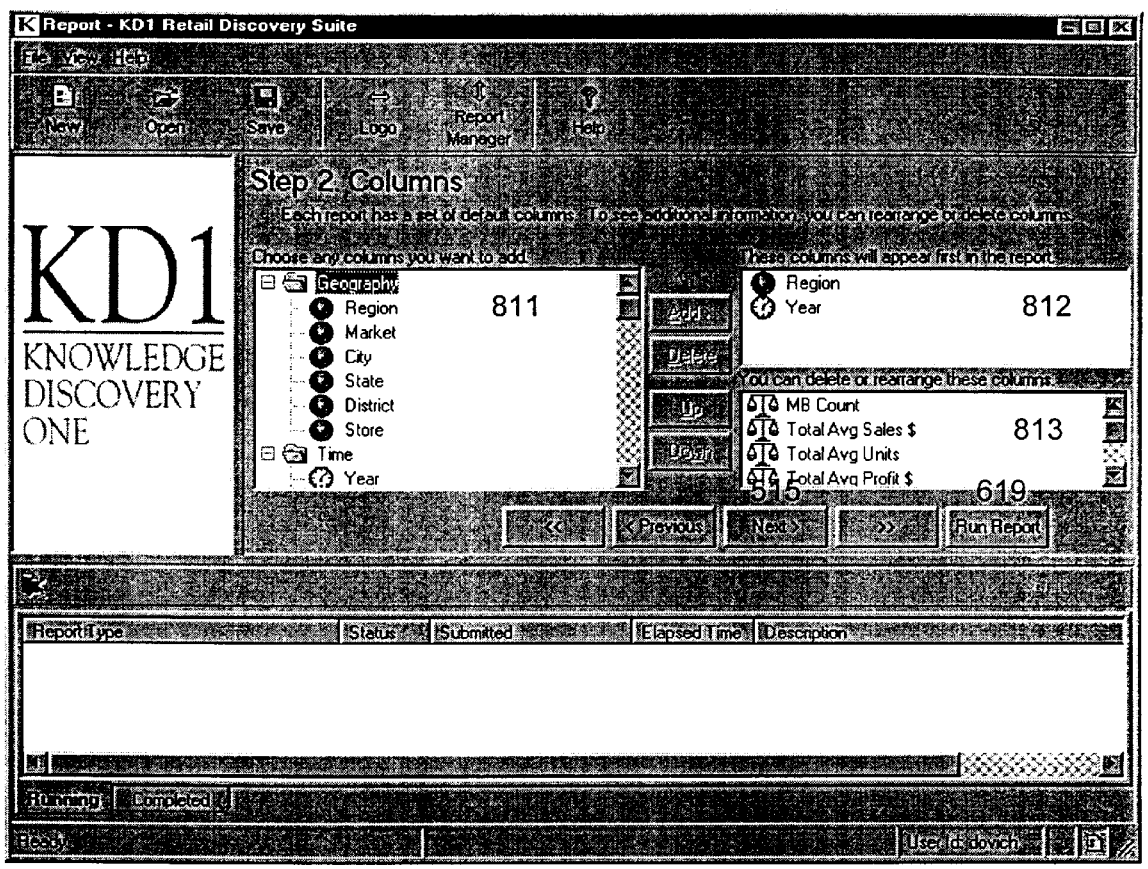
FIG. 8 shows a display panel presented to the user after the selection of the "Standard Pack Performance Tracking by Store" report type during a report configuration session according to the present invention.

FIG. 8 shows the next panel, a display panel 801, presented to the user upon selecting the "Standard Pack Performance Tracking by Store" report type. The display panel 801 for the "Standard Pack Performance Tracking by Store" report type presents the user with a group of default columns, or data fields, that will be presented on the report if the user does not customize the report but instead clicks directly on the "Run Report" button 619. These default columns are presented to the user in windows 812 and 813 of the display panel 801. The display panel 801 also gives the user options for customizing the columnar presentation of the report in windows 811 and 813. Window 811 contains data fields that can be added as columns to the report. Window 812 contains data fields that will always appear first on the report. Window 813 contains default business metrics that will appear on the report. The columns presented in window 813 can be deleted or rearranged by the user. For the "Standard Pack Performance Tracking by Store" report type, the user may choose to print geographic and time information as well as business metrics.

The selection items that appear as display data fields in windows 811, 812, and 813, as well as the structure in which they appear, may be obtained from metadata tables (not shown) or directly from the data warehouse 129. Such a metadata table may contain columns similar to those of Table 301 of FIG. 3A, such as the REPORT_TYPE_ID column 305, PARENT_REPORT_TYPE column 303, DISPLAY_ORDER 307, and GUI_NAME column 309. Columns such as the REPORT_TYPE_ID column 305 and the GUI_NAME column 309 would identify the display data fields to be presented on the panel. A column such as the DISPLAY_ORDER column 307 would determine the order in which display data fields are to be presented on the panel. A column such as PARENT_REPORT_TYPE column 303 would determine the structure in which display data fields are to be presented on the panel.

When the user has specified all columns to be displayed on the report, the user proceeds to the next panel by clicking on the "Next" button 515. The next type of panel to be presented for the "Standard Pack Performance Tracking by Store" report type is obtained from metadata table 401 by the data presentation module 201.

Figure 9:
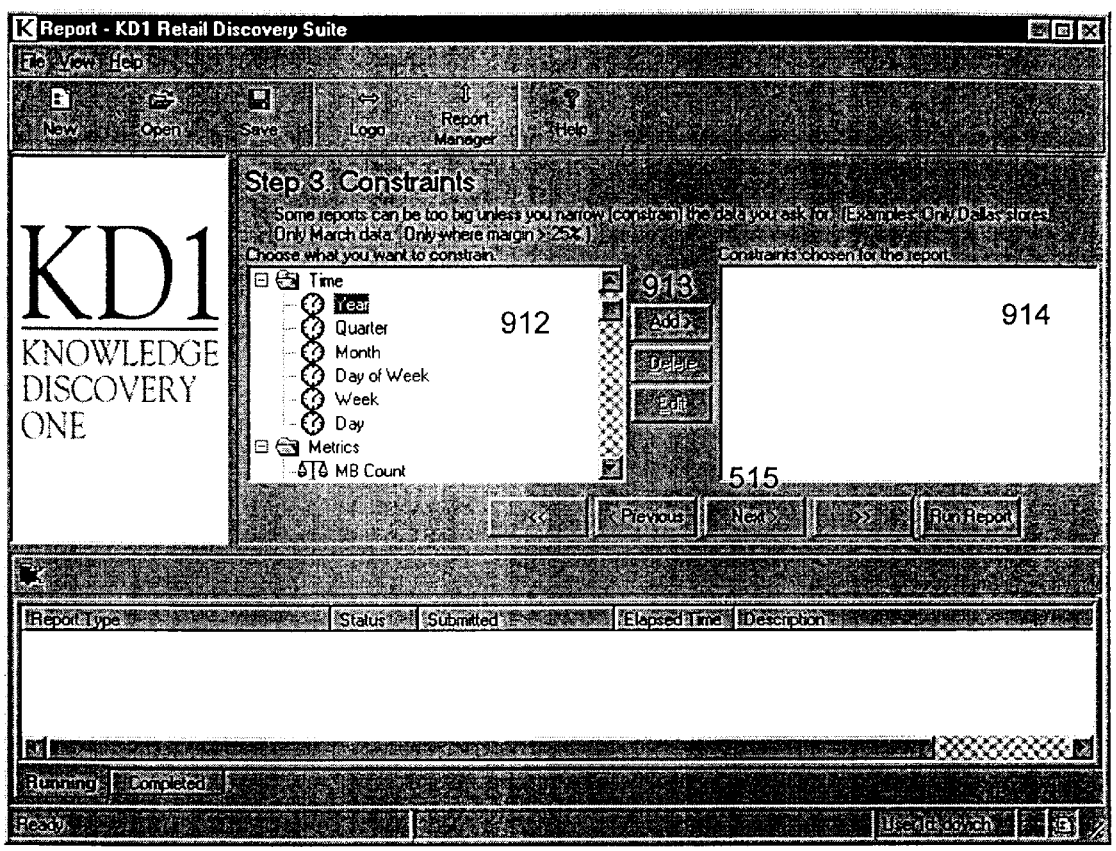
FIG. 9 shows a constraint panel presented during a report configuration session to allow the user to specify constraints on the data to be presented in a selected report according to the present invention.

Referring to FIG. 9, in response to clicking the "Next" button 515 on the display panel presented upon selecting the "Standard Pack Performance Tracking by Store" report type, the data presentation module presents a constraint panel 901 with constraint data fields available for the "Standard Pack Performance Tracking by Store" report type. For the "Standard Pack Performance Tracking by Store" report type, the user may limit the data to a particular time period, geographic area (not shown), or according to particular metrics. The constraint data fields available for the "Performance Tracking by Store" report type are obtained from tables (not shown) in metadata 135 by the data presentation module 201 software. The user highlights a data field on which to constrain the report, and then clicks the "Add" button 913 to add the constraint to the "Constraints chosen for the report" window 914 of the constraint panel 901.

The selection items that appear as constraint data fields in window 912, as well as the structure in which they appear, may be obtained from metadata tables (not shown) or directly from the data warehouse 129. Such a metadata table may contain columns such as those of Table 301 of FIG. 3A, including REPORT_TYPE_ID column 305, PARENT_PEPORT_TYPE column 303, DISPLAY_ORDER 307, and GUI_NAME column 309. Columns such as the REPORT_TYPE_ID column 305 and the GUI_NAME column 309 would identify the constraint data fields to be presented on the panel. A column such as the DISPLAY_ORDER column 307 would determine the order in which constraint data fields are to be presented on the panel. A column such as PARENT_REPORT_TYPE column 303 would determine the structure in which constraint data fields are to be presented on the panel.

Figure 10:
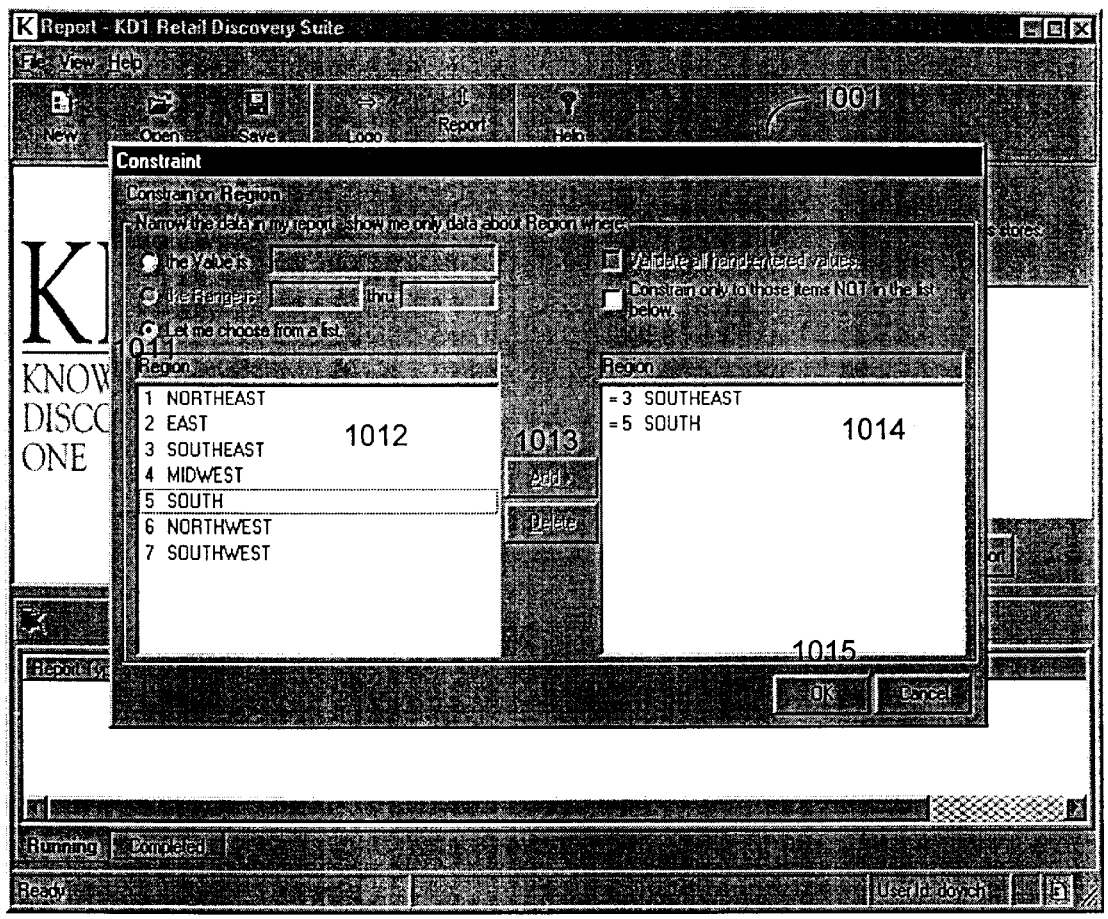
FIG. 10 shows a dialogue box panel to allow the user to choose a geographic region to constrain the data for a selected report during a report configuration session according to the present invention.

FIG. 10 shows a dialogue box panel 1001 displayed when the user has selected to constrain the "Performance Tracking by Store" report by Region by highlighting the "Region" data field and clicking on the "Add" button 913. The user has the option in this dialogue box panel to enter the value for a particular region or to choose a region from a list of available regions. If the user chooses to enter the value for a particular region, the data warehouse 129 is accessed through the data access component 207 of FIG. 2 to determine whether the value entered by the user is a valid value. In the example shown in FIG. 10, the user has selected the radio button 1011 to "Let me choose from a list." The list of Regions is retrieved from the data warehouse 129 via the data access component 207 of FIG. 2 and is presented to the user in window 1012 of the dialogue box panel. The user then highlights each Region of interest and clicks on the "Add" button 1013 to add the selected regions to window 1014. When the user has completed selecting Regions, the user clicks on the "OK" button 1015 to continue with the constraint panel. The dialogue box panels may also be metadata driven in a similar manner as described for the other types of panels.

Figure 11:
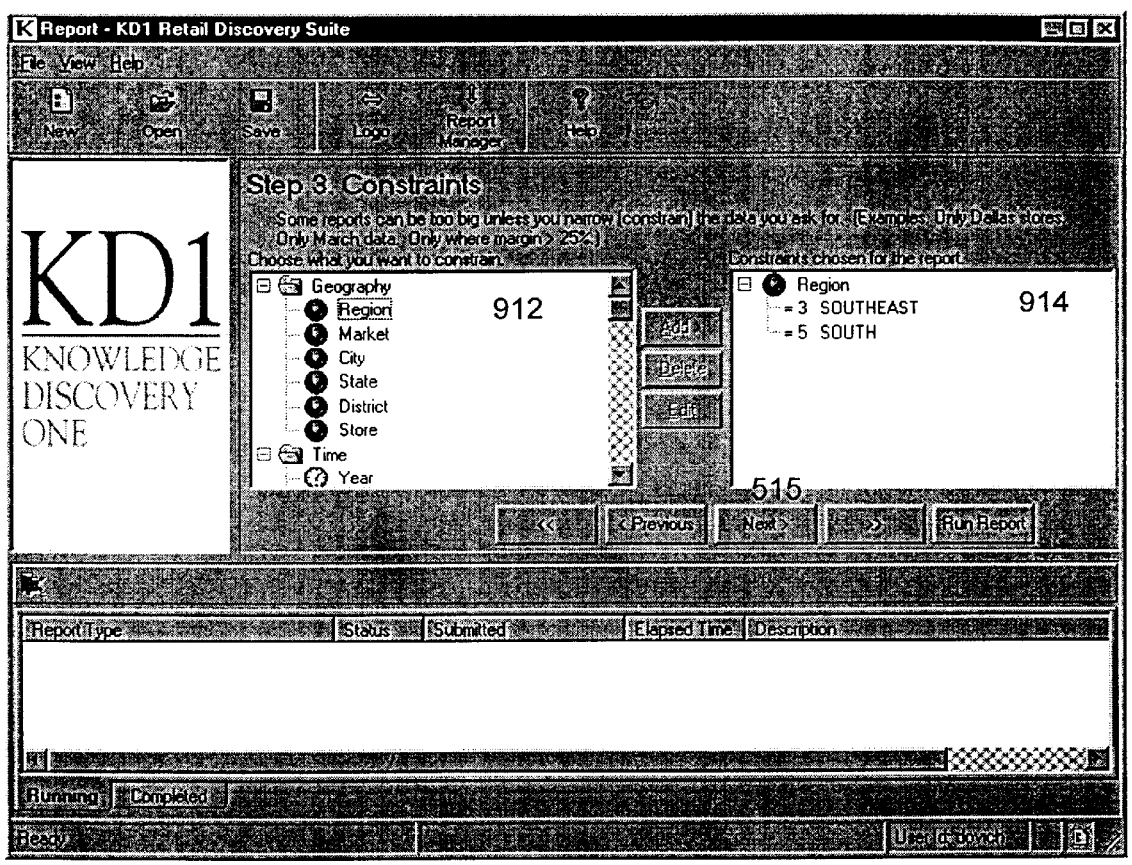
FIG. 11 shows a constraint panel showing a user's selection to constrain a report to a particular geographic region during a report configuration session according to the present invention.

FIG. 11 shows the constraint panel 901 after the user has completed selecting constraints. As shown in window 914, the user has chosen to limit the "Standard Pack Performance Tracking by Store" report to the Southeast and South regions in this particular report configuration session. The user may wish to select additional data fields from window 912. When the user has completed entering constraints for the report, the user clicks on the "Next" button 515 to proceed to the next panel of the report configuration session. In response to clicking the "Next" button, the data presentation module 201 accesses table 401 to determine the next panel to present to the user.

Figure 12:
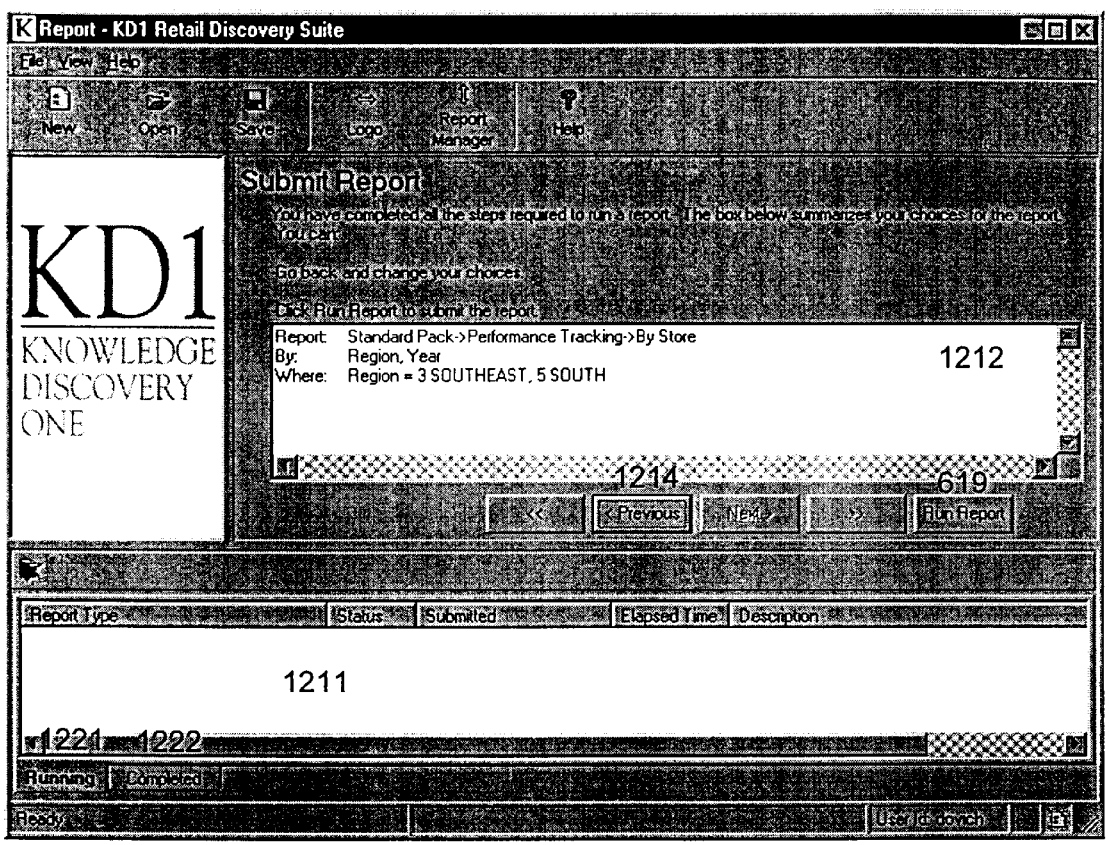
FIG. 12 shows a summary panel displaying report criteria selected by a user during a report configuration session according to the present invention.

Referring to FIG. 12, a summary panel 1201 is presented to the user when the user has completed all configuration panels for the particular report type selected. The user has the option to go back to the previous panel to change the report criteria by clicking on the "Previous" button 1214. The user also has the option to run the report with the report criteria selected by clicking on the "Run Report" button 619. Typically, there will be a delay between the time the user clicks on the "Run Report" button and the time all information has been retrieved from the computer database system and the report is available for viewing by the user. The report monitor 211 of FIG. 2 displays a window (such as window 1211 in FIG. 12) indicating the status of reports that have been requested by the user. Window 1211 has two "tabs" that may be selected by the user, a "Running" tab 1221 which displays the names of reports that are currently running but not yet completed, and a "Completed" tab 1222 which displays the names of reports that have completed.

Figure 13:
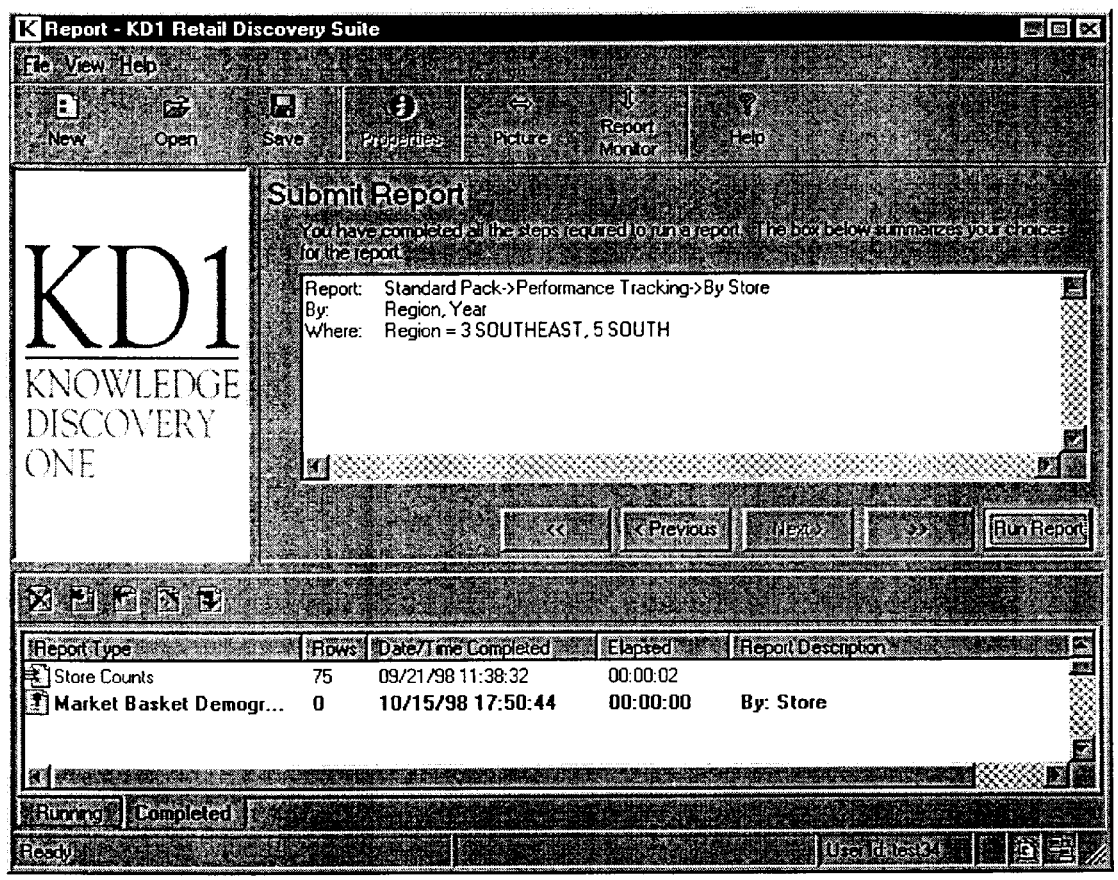
FIG. 13 shows the report monitor window of a panel presented to the user indicating that a requested report is completed and ready for viewing during a report configuration session according to the present invention.

FIG. 13 shows a list of completed reports in the "Completed" tab. To view the report, the user will double-click on the name of the report and the report monitor 211 of FIG. 2 will initiate the display of the report for the user. To display the report to the user, the report monitor 211 invokes the appropriate software program (such as the Excel component 217 of FIG. 2) to display the report in textual, tabular, and/or graphical formats.

FIG. 14 shows the display of the actual report after the user has double-clicked on the name of the report in the "Completed" tab. In this example, the report is a tabular report being presented by Excel software in a spreadsheet format.

Although the report configuration session shown in FIGS. 5 through 14 is part of a system for generating useful knowledge from transactional data, the metadata-driven data presentation module described herein may be implemented for other types of databases.

Based upon the teachings herein, those of skill in the art will recognize that other panel presentation parameters of data presentation module 201 can be metadata-driven. For example, in table 401 of FIG. 4, a new data field, or column, containing the text to be displayed in a help window for each panel could be added. This column would allow for the customization of help instructions for the different types of panels. To change the help instructions for a panel, the data presentation module administrator may change data in metadata tables. Similarly, a column could be added to contain a custom logo to be displayed on each panel (as in window 503 of FIG. 5).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for configuring presentation of information from a database system comprising:

initiating access of at least one metadata file to obtain at least one panel presentation parameter from the at least one metadata file; and displaying at least one panel via a user interface according to the at least one panel presentation parameter obtained from the metadata file, the at least one panel allowing a user to configure the presentation of information from a database system.

2. The method of claim 1 wherein the information from the database system includes useful knowledge derived from an analysis of transactional data.

3. The method of claim 1 wherein the at least one metadata file includes a metadata table.

4. The method of claim 1 wherein initiating the access of at least one metadata file includes invoking a metadata API.

5. The method of claim 1 wherein the at least one panel presentation parameter is configurable according to at least one configuration parameter.

6. The method of claim 5 wherein the at least one configuration parameter includes at least one of a group consisting of users and projects.

7. The method of claim 1 wherein the at least one panel presentation parameter includes selection items to be presented on the panel.

8. The method of claim 7 wherein the at least one panel presentation parameter includes a structure, the selection items being presented on the panel according to the structure.

9. The method of claim 7 wherein the at least one panel presentation parameter includes an order in which the selection items are to be presented on the panel.

10. The method of claim 7 wherein the selection items include display data fields.

11. The method of claim 7 wherein the selection items include constraint data fields.

12. The method of claim 7 wherein the selection items include report types.

13. The method of claim 12 wherein the selection items include groupings of report types.

14. The method of claim 12 wherein the selection items include sub-groupings of report types.

15. The method of claim 7 wherein the selection items include at least one of a group consisting of display data fields, constraint data fields, report types, groupings of report types, and sub-groupings of report types.

16. The method of claim 1 wherein the at least one panel presentation parameter includes at least one intra-panel presentation parameter.

17. The method of claim 16 wherein the at least one intra-panel presentation parameter is configurable according to at least one configuration parameter.

18. The method of claim 17 wherein the at least one configuration parameter includes at least one of a group consisting of users and projects.

19. The method of claim 16 wherein the at least one intra-panel presentation parameter includes selection items to be presented on a panel.

20. The method of claim 19 wherein the displaying at least one panel according to the at least one panel presentation parameter obtained from the metadata file includes displaying the selection items on the panel.

21. The method of claim 19 wherein the selection items to be presented on a panel include at least one of a group consisting of display data fields, constraint data fields, report types, groupings of report types, and sub-groupings of report types.

22. The method of claim 16 wherein the at least one intra-panel presentation parameter includes an order in which selection items are to be displayed on the panel.

23. The method of claim 22 wherein the displaying at least one panel according to the at least one panel presentation parameter obtained from the metadata file includes displaying selection items on the panel in the order specified by the at least one intra-panel presentation parameter.

24. The method of claim 16 wherein the at least one intra-panel presentation parameter defines a structure in which selection items are to be displayed on the panel.

25. The method of claim 24 wherein the displaying at least one panel according to the at least one panel presentation parameter obtained from the metadata file includes displaying the selection items on the panel in the structure defined by the at least one intra-panel presentation parameter.

26. The method of claim 24 wherein the structure is a tree structure that includes two or more levels.

27. The method of claim 1 wherein the at least one panel presentation parameter includes at least one inter-panel presentation parameter.

28. The method of claim 27 wherein the at least one inter-panel presentation parameter is configurable according to at least one configuration parameter.

29. The method of claim 28 wherein the at least one configuration parameter includes at least one of a group consisting of users and projects.

30. The method of claim 27 wherein the at least one inter-panel presentation parameter includes the types of the at least one panel that is to be displayed during a report configuration session.

31. The method of claim 30 wherein the displaying at least one panel according to the at least one panel presentation parameter obtained from the metadata file includes displaying a panel of each type of panel indicated by the at least one inter-panel presentation parameter.

32. The method of claim 27 wherein the at least one inter-panel presentation parameter includes the types of at least one panel that is to be displayed for a selection item selected by the user on a previous panel.

33. The method of claim 32 wherein the selection item selected by the user on a previous panel include at least one of a group consisting of report types, groupings of report types, sub-groupings of report types, display data fields, and constraint data fields.

34. The method of claim 32 wherein the displaying at least one panel according to the at least one panel presentation parameter obtained from the metadata file includes displaying a panel for each type of panel that is to be displayed for the selection item selected by the user on a previous panel.

35. The method of claim 27 wherein the at least one inter-panel presentation parameter includes an order in which the at least one panels are to be displayed.

36. The method of claim 35 wherein the displaying at least one panel according to the at least one panel presentation parameter obtained from the metadata file includes displaying the at least one panel in the order specified by the at least one inter-panel presentation parameter.

37. The method of claim 27 wherein the at least one inter-panel presentation parameter includes an order in which the at least one panel is to be displayed for a selection item selected by the user on a previous panel.

38. The method of claim 37 wherein displaying the at least one panel according to the at least one panel presentation parameter obtained from the metadata file includes displaying the at least one panel for the selection item selected by the user in the order specified by the at least one inter-panel presentation parameter.

39. The method of claim 1 wherein the initiating the access of at least one metadata file includes writing the at least one metadata file to a each memory of a computer system prior to displaying the at least one panel.

40. The method of claim 1 further comprising:
   initiating access of the computer database to obtain information requested according to the selected information presentation configuration; and
   displaying the information requested per the selected information presentation configuration.

41. An article of manufacture comprising:
   a computer-readable medium;
   means for initiating access of at least one metadata file to obtain at least one panel presentation parameter from the at least one metadata file, the means for initiating access being stored in the computer-readable medium; and
   means for displaying at least one panel via a user interface according to the at least one panel presentation parameter obtained from the metadata file, the means for displaying being stored in the computer-readable medium, the at least one panel allowing a user to configure the presentation of information from a database system.

42. The article of manufacture of claim 41 wherein the information from the database system includes useful knowledge derived from an analysis of transactional data.

43. The article of manufacture of claim 41 wherein the at least one metadata file includes a metadata table.

44. The article of manufacture of claim 41 wherein means for initiating access of at least one metadata file includes means for invoking a metadata API.

45. The article of manufacture of claim 41 wherein the at least one panel presentation parameter includes at least one intra-panel presentation parameter.

46. The article of manufacture of claim 45 wherein the at least one intra-panel presentation parameter is configurable according to at least one configuration parameter.

47. The article of manufacture of claim 46 wherein the at least one configuration parameter includes at least one of a group consisting of users and projects.

48. The article of manufacture of claim 45 wherein the at least one intra-panel presentation parameter includes selection items to be presented on a panel.

49. The article of manufacture of claim 48 wherein the means for displaying at least one panel according to the at least one panel presentation parameter obtained from the metadata file includes means for displaying the selection items on the panel.

50. The article of manufacture of claim 48 wherein the selection items to be presented on a panel include at least one of a group consisting of display data fields, constraint data fields, report types, groupings of report types, and sub-groupings of report types.

51. The article of manufacture of claim 45 wherein the at least one intra-panel presentation parameter includes an order in which selection items are to be displayed on the panel.

52. The article of manufacture of claim 51 wherein the means for displaying at least one panel according to the at least one panel presentation parameter obtained from the metadata file includes means for displaying selection items on the panel in the order specified by the at least one intra-panel presentation parameter.

53. The article of manufacture of claim 45 wherein the at least one intra-panel presentation parameter defines a structure in which selection items are to be displayed on the panel.

54. The article of manufacture of claim 53 wherein the structure is a tree structure that includes two or more levels.

55. The article of manufacture of claim 53 wherein the means for displaying at least one panel according to the at least one panel presentation parameter obtained from the metadata file includes means for displaying selection items on the panel in the structure defined by the at least one intra-panel presentation parameter.

56. The article of manufacture of claim 48 wherein the selection items are displayed in a tree structure that includes two or more levels wherein the at least one intra-panel presentation parameter includes an order in which a selection item is to be presented within a level of the tree structure.

57. The article of manufacture of claim 41 wherein the at least one panel presentation parameter includes at least one inter-panel presentation parameter.

58. The article of manufacture of claim 57 wherein the at least one inter-panel presentation parameter is configurable according to at least one configuration parameter.

59. The article of manufacture of claim 58 wherein the at least one configuration parameter includes at least one of a group consisting of users and projects.

60. The article of manufacture of claim 57 wherein the at least one inter-panel presentation parameter includes the types of the at least one panel that is to be displayed during a report configuration session.

61. The article of manufacture of claim 60 wherein the means for displaying at least one panel according to the at least one panel presentation parameter obtained from the metadata file includes means for displaying a panel of each type of panel indicated by the at least one inter-panel presentation parameter.

62. The article of manufacture of claim 57 wherein the at least one inter-panel presentation parameter includes the types of at least one panel that is to be displayed for a selection item selected by the user on a previous panel.

63. The article of manufacture of claim 57 wherein the at least one inter-panel presentation parameter includes an order in which the at least one panels are to be displayed.

64. The article of manufacture of claim 63 wherein the means for displaying at least one panel according to the at least one panel presentation parameter obtained from the metadata file includes means for displaying the at least one panel in the order specified by the at least one inter-panel presentation parameter.

65. The article of manufacture of claim 62 wherein the selection item selected by the user on a previous panel includes at least one of a group consisting of report types, groupings of report types, sub-groupings of report types, display data fields, and constraint data fields.

66. The article of manufacture of claim 62 wherein the means for displaying at least one panel according to the at least one panel presentation parameter obtained from the metadata file includes means for displaying a panel for each type of panel that is to be displayed for the selection item selected by the user on a previous panel.

67. The article of manufacture of claim 57 wherein the at least one inter-panel presentation parameter includes an order in which the at least one panel is to be displayed for a selection item selected by the user on a previous panel.

68. The article of manufacture of claim 67 wherein means for displaying the at least one panel according to the at least one panel presentation parameter obtained from the metadata file includes means for displaying the at least one panel for the selection item selected by the user in the order specified by the at least one inter-panel presentation parameter.

69. The article of manufacture of claim 41 wherein the means for initiating access of at least one metadata file includes means for writing the at least one metadata file to a cache memory of a computer system prior to displaying the at least one panel.

70. The article of manufacture of claim 41 further comprising:

means for initiating access of the computer database to obtain information requested according to a selected information presentation configuration, the means for initiating access of the computer database being stored in the computer-readable medium; and means for displaying the information requested per the selected information presentation configuration, the means for displaying being stored in the computer-readable medium.

\* \* \* \* \*